(12) United States Patent
Le Floch et al.

(10) Patent No.: US 8,103,001 B2
(45) Date of Patent: Jan. 24, 2012

(54) METHOD FOR VERIFYING RIGHTS CONTAINED IN A SECURITY MODULE

(75) Inventors: Dominique Le Floch, Montrouge (FR); Michel Maillard, Rambouillet (FR)

(73) Assignee: Nagra France SAS, Paris (FR)

( * ) Notice: Subject to any disclaimer, the term of this patent is extended or adjusted under 35 U.S.C. 154(b) by 1177 days.

(21) Appl. No.: 11/543,831

(22) Filed: Oct. 6, 2006

(65) Prior Publication Data

US 2007/0083756 A1    Apr. 12, 2007

(30) Foreign Application Priority Data

Oct. 7, 2005   (EP) ..................................... 05292094

(51) Int. Cl.
*H04N 7/167*   (2011.01)
*H04L 9/00*    (2006.01)
*H04L 9/08*    (2006.01)

(52) U.S. Cl. ........ 380/239; 380/240; 380/241; 380/242; 380/228; 380/229; 380/201; 380/200; 713/170; 713/171; 713/172; 713/181; 713/182; 726/2; 726/3; 726/4; 726/5; 726/9; 726/21; 726/26; 726/27; 705/57; 709/232

(58) Field of Classification Search .......................... None
See application file for complete search history.

(56) References Cited

U.S. PATENT DOCUMENTS

| | | | |
|---|---|---|---|
| 5,461,675 A | 10/1995 | Diehl et al. | |
| 5,991,400 A | 11/1999 | Kamperman | |
| 6,219,422 B1 * | 4/2001 | Sato | 380/240 |
| 6,424,717 B1 * | 7/2002 | Pinder et al. | 380/239 |
| 6,937,729 B2 * | 8/2005 | Akins et al. | 380/239 |
| 7,131,001 B1 * | 10/2006 | Johnson | 713/168 |
| 7,228,439 B2 * | 6/2007 | Sasselli | 713/193 |

(Continued)

FOREIGN PATENT DOCUMENTS

WO    WO 98/43430    10/1998

(Continued)

OTHER PUBLICATIONS

"Functional Model of a Conditional Access System". EBU Review—Technical, European Broadcasting Union. Brussels, BE, No. 266, Dec. 21, 1995, pp. 64-77.

(Continued)

*Primary Examiner* — Syed A. Zia
(74) *Attorney, Agent, or Firm* — Harness, Dickey & Pierce, P.L.C.

(57) ABSTRACT

A method of verification of rights is disclosed, contained in a security module associated to an apparatus processing broadcasted digital data. The apparatus is connected to a management center transmitting encrypted rights messages for accessing the digital data. The method includes reception and reading by the security module of all or part of a rights message including at least one right and means for verifying the right, decryption and verification of the rights message and updating of a rights memory, and storage of all or part of the rights message in a messages memory. During a further verification step, the method includes identification of at least one right present in the rights memory, search of the corresponding stored rights message and verification of the rights message, comparison of the right contained in the rights message with the corresponding right stored in the rights memory, and determination of a default state when the result of the comparison indicates a difference.

17 Claims, 2 Drawing Sheets

U.S. PATENT DOCUMENTS

| | | | |
|---|---|---|---|
| 7,240,199 B2 * | 7/2007 | Tomkow | 713/168 |
| 7,489,780 B2 * | 2/2009 | Dellow et al. | 380/239 |
| 7,581,110 B1 * | 8/2009 | Probasco | 713/181 |
| 7,962,744 B2 * | 6/2011 | Yamamoto et al. | 713/155 |
| 2002/0003884 A1 * | 1/2002 | Sprunk | 380/239 |
| 2003/0074565 A1 * | 4/2003 | Wasilewski et al. | 713/182 |
| 2004/0107350 A1 * | 6/2004 | Wasilewski et al. | 713/182 |
| 2005/0063541 A1 * | 3/2005 | Candelore | 380/239 |
| 2005/0238170 A1 * | 10/2005 | Ksontini et al. | 380/268 |
| 2006/0078109 A1 * | 4/2006 | Akashika et al. | 380/30 |
| 2007/0223695 A1 * | 9/2007 | Beun et al. | 380/239 |
| 2007/0286422 A1 * | 12/2007 | Cocchi et al. | 380/239 |

FOREIGN PATENT DOCUMENTS

| | | |
|---|---|---|
| WO | WO 2004/008765 | 1/2004 |
| WO | WO 2004/071087 | 8/2004 |

OTHER PUBLICATIONS

European Search Report.

* cited by examiner

METHOD FOR VERIFYING RIGHTS CONTAINED IN A SECURITY MODULE

FIELD OF THE INVENTION

The present invention relates to the field of security modules used as a protection and personalization device of various electronic apparatuses, such as Pay-TV decoders, personal computers, portable equipments etc.

A security module is a reputedly tamper-proof device containing various encryption/decryption keys as well as user specific data defining rights that the user has acquired for data use. The security module can be found in different forms such as a smart card inserted into a reader, an integrated circuit welded onto a mother board, a SIM card of a mobile phone etc.

TECHNICAL BACKGROUND

Decoder security modules for Pay-TV for example contain encryption/decryption keys for decoding an audio/video data stream entering into the decoder. In order to obtain the data in clear, third parties, more commonly called "hackers", have to resort to different fraudulent methods such as hardware or software attacks. These attacks are directed more particularly at the data contained in the memory of the security module that the "hacker" attempts to modify for obtaining rights unduly.

A right is shown generally in form of a command, a message or an instruction accompanied by parameters or it can be a key allowing releasing an access to broadcasted audio/video data, for example. Such a right authorizes, amongst others, either access to one or a bouquet of particular broadcasted channels or programs during a predefined period, or also access to a specific type of program acquired after an on-line payment.

A current attack consists of perturbing the execution by the processor of the security module, of the machine code of the computer program (glitch attack). For example, the "hacker" analyses the signals generated by the instructions of the processor and when a comparison or skip instruction is executed, applies a fast external perturbation or increases the frequency of the clock signal. The instructions are thus temporarily blocked and the authentication of sensitive data can be bypassed.

In the field of Pay-TV, the security module associated with the decoder receives and stores the rights extracted from entitlement management messages EMM transmitted by the management center of an operator. These rights authorize the decryption and visualization of TV programs that the subscriber has acquired. Other types of attacks consist of creating false management messages EMM or of using a security failure. A countermeasure against the abusive replacement of the content of the memory relating to the rights consists of calculating a digest or a "checksum" of this content with a unidirectional mathematical function. A comparison with a reference digest allows distinguishing a modified content from an authentic one.

When a false EMM message has been accepted by the security module, this countermeasure becomes useless. In the case of a correction of this security failure by a corrective program, the locally calculated digest locally will be correct, without necessarily corresponding to a digest calculated on the rights registered at the management center. In order to complete the verification, a message requiring the comparison of the local digest with the remote digest of the management center is transmitted by each security module to said center. This sending of messages represents an important drawback as on one hand the connection of the decoder equipped with a security module with the management center can be congested and on the other hand the center itself destined for verifying the digests after each EMM messages sending can be overloaded.

SUMMARY OF THE INVENTION

The aim of the present invention is to minimize the number of messages exchanged between the security module and the management center as well as the number of verification operations carried out by the latter. Another aim is to provide an effective countermeasure against the attacks carried out by "hackers" that exploit a provisional security failure for modifying the rights stored in the security module.

These aims are achieved by a method of verification of rights contained in a security module associated to an apparatus processing broadcasted digital data, said apparatus being connected to a management center transmitting encrypted rights messages for accessing said digital data comprising the steps of:
 reception and reading by the security module of all or part of a rights message including at least one right and means for verifying said right,
 decryption and verification of the rights message and updating of a rights memory,
 storage of all or part of said rights message in a messages memory, during a further verification step,
 identification of at least one right present in the rights memory,
 search of the corresponding stored rights message and verification of said rights message,
 comparison of the right contained in the rights message with the corresponding right stored in the rights memory,
 determination of a default state when the result of the comparison indicates a difference.

The rights message transmitted by the management center includes at least one right and verification means such as a digest calculated on this right, for example, with an unidirectional function without collision of the "Hash" type. This message is encrypted either with a unique key specific to the security module of the apparatus or with key common to a group of security modules. The latter contains rights that are stored in a rights memory according to a first embodiment of the method.

Each message updating the rights memory is stored in a messages memory, this message can be stored completely or partially with only the useful part obtained after extraction of the headings, the number of the security module, etc. This part of the message remains in a secure form, either encrypted or signed, i.e. accompanied by an encrypted digest.

The rights message received from the management center is decrypted with its transport key, which can be either a global key or a key specific to the security module. Then, verification is carried out with the digest or signature accompanying the right. This digest is compared with a digest determined by the security module and when the result of the comparison is positive, the message is stored in the messages memory and the corresponding right stored in the rights memory is updated.

Another way to verify the received right is to extract from the received digest the value of the right and compare this calculated right with the right contained in the message. This can be achieved by a digest determined by the encryption of the right. The possession of the same key (symmetric key) or of the corresponding key (asymmetric key) allows this type of extraction.

During the further verification, a right stored in the rights memory is first identified and the corresponding message having lead to the storage of said right is searched in the message memory. This rights message is verified with its digest. If this message has been stored in the encrypted form, it is previously decrypted with the transport key or the unique key of the security module.

In the case of a successful verification, the right extracted from the message is compared with the corresponding stored right.

This further verification called re-execution of the rights message can be carried out either at the start of the apparatus or on reception of a control message ECM or a management message EMM, or periodically at predetermined intervals. When the result of the comparison is negative, the apparatus operates according to a default mode with restricted access rights to data, for example.

A second embodiment of the present invention proposes a method of verification of rights contained in a security module associated to an apparatus processing broadcasted digital data, said apparatus being connected to a management center transmitting encrypted rights messages for accessing to said digital data and control messages for decrypting the broadcasted data, comprising following steps:

reception and reading by the security module of all or part of a rights message including at least one right and means for verification of said right, decryption and verification of the rights message and storage of all or part of said rights message in a messages memory, reception of a control message comprising at least one control word for decrypting the broadcasted data and extraction of a conditional right from said control message, said conditional right defining the right(s) necessary for using the control word, search for the stored rights message corresponding to the conditional right previously extracted and verification of said rights message, comparison of the right contained in the rights message with the conditional right extracted from the control message, determination of a default state when the result of the comparison indicates a difference.

In this embodiment the rights memory is no longer necessary since the verification of the rights is carried out "live" during reception of a control message ECM. The latter includes a conditional right that is compared, after searching for the corresponding message in the messages memory, with the right obtained after re-execution of the found message.

According to a further embodiment, the received rights message, once decrypted with the transport key, can be re-encrypted with a local key before its storage in the messages memory. Before verifying such a message, it will be necessary to decrypt it with this local key.

BRIEF DESCRIPTION OF THE DRAWINGS

The invention will be better understood thanks to the following detailed description that refers to the annexed figures given as non-limitative examples.

DETAILED DESCRIPTION OF THE INVENTION

The example described hereinafter refers to the field of digital pay television wherein a decoder (or set top box) receiving an audio video data stream is connected to a management center. The latter transmits to the decoder, via the stream, management or rights messages (EMM) containing at least one right (Dr) accompanied by its digest H(Dr).

According to the example, it will be considered the updating of a security module in a unique way, namely by the addressing of a personal message.

The set made up of the right (Dr) and its digest H(Dr) is encrypted with a unique personal key (Ku) of the security module associated with the decoder. The message (EMM) is encrypted with a global key (Kg), preferably asymmetric. In this example, the digest H(Dr) is obtained with a unidirectional function without collision of the Hash type applied on the right (Dr).

The message (EMM) or rather a part of it can then be represented in the form {[Dr, H(Dr)]Ku}Kg. The global key (Kg) is a public key corresponding to a private key contained in the security module allowing the decryption of the EMM message in its entirety.

Figure 1:
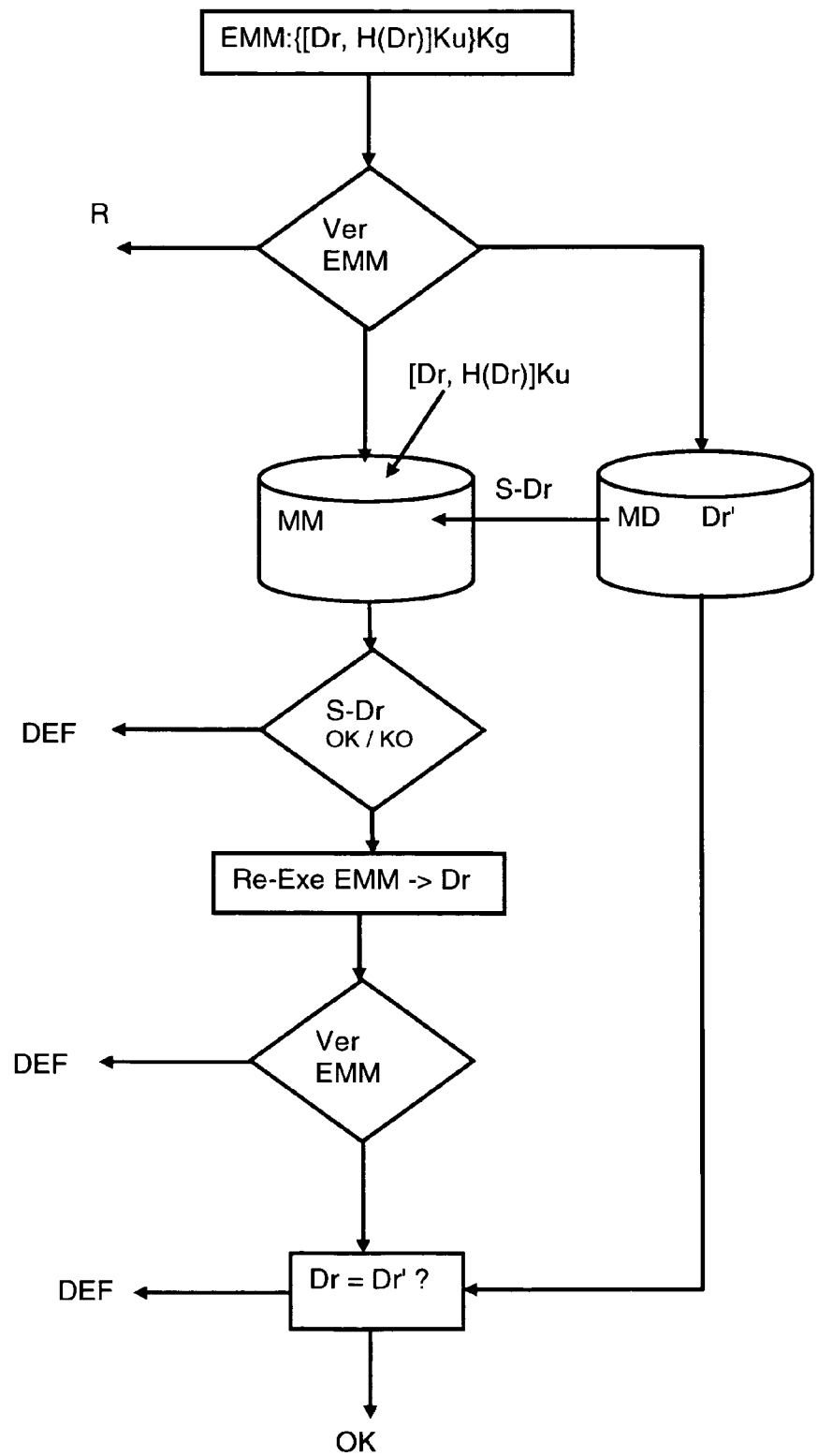
FIG. 1 shows a flow chart representing the method of verification of the rights according to a first embodiment with a rights memory storing the rights that are compared with corresponding rights of the rights messages.

According to a first embodiment disclosed by the diagram of FIG. 1, the EMM message or at least the part containing the right (Dr) and its digest H(Dr) is first verified (Ver EMM) before being stored in the messages memory (MM). The set right-digest [Dr, H(Dr)]Ku is decrypted with the personal key (Ku) of the security module. A digest H' (Dr) of the right Dr is calculated by the security module with the "Hash" function and is then compared with the digest received H(Dr). When the comparison is positive, that is to say when the calculated digest H' (Dr) and the received digest H(Dr) are identical, the message (EMM) is stored in the messages memory (MM) and the corresponding right (Dr) is updated in the rights memory (MD).

In the opposite case of an unsuccessful verification, the EMM message is rejected (R) and no update will be carried out in the rights memory (MD). According to. the options of the decoder, such rejection (R) can be signaled by a suitable error message and if the number of rejections (R) exceeds a certain threshold, the security module can be blocked.

The EMM message containing the right (Dr) and its digest H(Dr) is stored in the messages memory (MM) preferably after decryption with the global key (Kg), that is to say in the form [Dr, H(Dr)]Ku.

During the step of further verification, the right stored (Dr') in the rights memory (MD) is compared with the message (EMM) which has generated this right or its update, the message (EMM) is thus re-executed (Re-Exe EMM) and the right (Dr) obtained is compared with the right (Dr') previously stored. In a first step, the right (Dr) to be verified is identified for example on the base of data selected in the broadcasted stream among the rights stored in the rights memory (MD). The corresponding rights message (EMM) is then searched (S-Dr) in the message memory (MM) and then decrypted with the key (Ku) of the security module and verified with the digest H(Dr) accompanying this right. This verification is carried out in the same way as that carried out before the storage of the message (EMM) and of the right (Dr) after reception. When this verification succeeds, the right (Dr')

stored in the rights memory (MD) is compared with its counterparts (Dr) extracted from the rights message (EMM).

If the re-executed right (Dr) does not correspond with the right Dr' contained in the rights memory (MD) (Dr=Dr'?), the security module determines a default state (DEF) of the decoder leading either to a working state with restricted rights, or to a blocked state requiring a particular intervention for reactivation. If the two rights correspond (Dr=Dr'), the security module of the decoder authorizes (OK) access to audio/video data according to the stored rights.

This default state (DEF) can also be determined when the verification of the right (Dr) of the message (EMM) with its digest H(Dr) failed with a calculated digest H' (Dr) different to that extracted from the message (EMM).

When the search (S-Dr) for the message (EMM) corresponding to a right (Dr) previously identified in the rights memory (MD) fails to reach any result (S-Dr KO), the security module can also determine a default state (DEF). This situation arises when a right (Dr) has been introduced into the memory (MD) by means other than via rights messages (EMM), for example with a suitable software using a security failure allowing an easy access to the rights memory (MD).

According to an application example, blocking of the security module requires a re-launch request at the management center through another communication line (fax, telephone, mail, short message etc.) separate from the back channel of the decoder. The security module can also be unblocked with a particular key of the PUK type (Personal Unblocking Key) in a same way than a SIM card (Subscriber Identity Module) of a mobile telephone that has been blocked due to an excessive number of starting errors.

The further verification can be carried out at different times: for example, it can be made at the starting of the decoder, or after reception of a control message (ECM), or on command thanks to a management message (EMM), or also according to a period determined by a parameter in the software of the security module or of the decoder.

According to one embodiment, only the digest H(Dr) encrypted with the unique key (Ku) of the security module can be stored in the message memory (MM). At the verification step, the digest H(Dr) is decrypted and compared with a digest H' (Dr) calculated on the corresponding right stored in the rights memory (MD).

Figure 2:
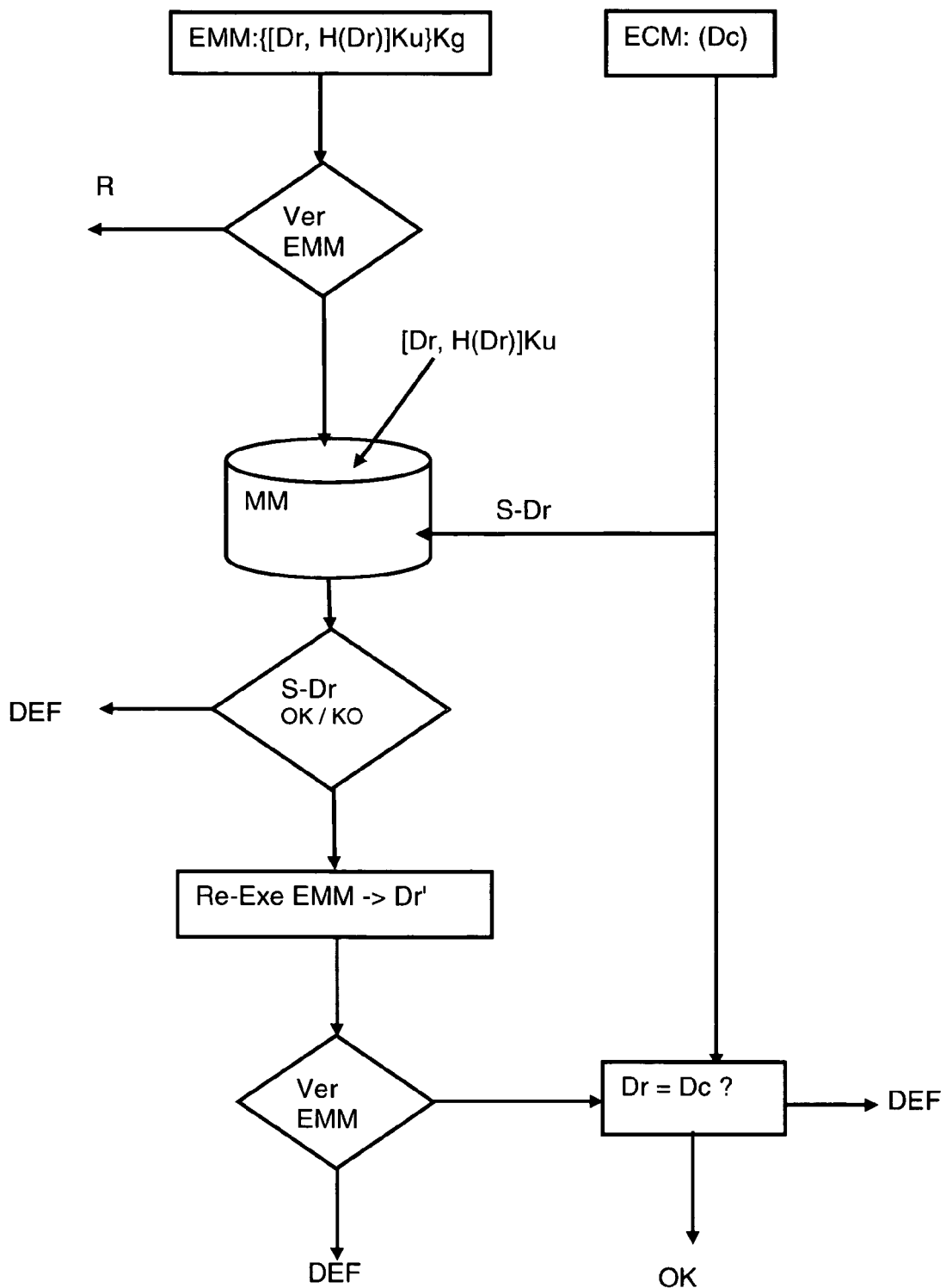
FIG. 2 shows a flow chart representing the verification method of the rights according to a second embodiment without rights memory by comparing directly a right of a control message ECM with a right of a rights message.

According to a second embodiment illustrated by the diagram in FIG. 2, the rights memory (MD) is no longer necessary since verification is carried out by comparing directly the rights of the messages (EMM) stored with the conditional rights included in the control messages (ECM) regularly broadcasted in the audio/video data stream. These rights are necessary for the use of control word(s) included in the control message (ECM) during the decryption of the audio/video data of the broadcasted stream.

A rights message (EMM) received, decrypted with the global key (Kg) then verified with the digest H(Dr) of the right (Dr) is stored in the messages memory (MM). As in the first method, when the verification fails, the rights message (EMM) is rejected (R) leading to the signaling of an error or the blocking of the security module. On reception of a control message (ECM) containing a conditional right (Dc), a search (S-Dr) for a rights message (EMM) corresponding to the conditional right (Dc) extracted from the ECM message is carried out in the message memory (MM). When the rights message is found, it is re-executed, that is to say decrypted with the unique key (Ku) of the security module and the obtained right (Dr) is verified (Ver EMM) with its digest H(Dr). If this verification (Ver EMM) is successful, the right (Dr) is compared with the one from the control message ECM (Dr=Dc?). The security module determines a default state (DEF) when the verification of the message fails or when the comparison gives a negative result. This same default state (DEF) can be determined when the search (S-Dr) for a message corresponding to a right received by means of a control message ECM is not successful (S-Dr KO).

This verification process and comparison can be activated at different times namely:
on each reception of a control message ECM or
after the reception of a predetermined number of ECM messages, for example after 20 ECM messages received or
on command thanks to an instruction included in an EMM or ECM message, or
periodically at predefined time intervals, for example every 10 minutes.

According to one possible configuration for the two embodiments of the method, each unsuccessful verification of a right with its digest can cause the blocking of the security module or limitations on access to the data of the broadcasted stream in the same way as a negative result of the comparisons of the rights during the last step.

The invention claimed is:

1. A method of verification of rights contained in a security module associated to an apparatus processing broadcasted digital data, the rights comprising instructions and parameters authorizing a user to access to the broadcast digital data, said apparatus being connected to a management center transmitting encrypted rights messages containing the rights, comprising the steps of:

receiving and reading by the security module of all or part of a rights message including at least one right and a digest obtained with a collision free unidirectional function applied on the right, wherein a set including the right and the digest of the right is encrypted with a unique key of the security module, decrypting the rights message by the security module with a global key, decrypting the set including the right and the digest of the right with the unique key, verifying the right of the decrypted set by comparing the digest of the right with a digest determined by the security module, when the digest of the right corresponds with the determined digest, updating rights stored in a rights memory, and storing all or part of said rights message in a messages memory, during a further step of the rights message re-execution, identifying at least one right present in the rights memory, searching in the messages memory a stored rights message corresponding to the at least one identified right and verifying the corresponding rights message by comparing the digest contained in the stored rights message with a digest determined by the security module when the digest contained in the stored rights message corresponds with the determined digest, comparing the right contained in the stored rights message with the corresponding right stored in the rights memory, determining a default state when a result of the comparison of the rights indicates a difference.

2. The method according to claim 1, wherein the rights message is stored in the messages memory after decryption with the global key.

3. The method according to claim 1, wherein the rights message is rejected when the verification fails with a negative result of the comparison of the two digests.

4. The method according to claim 1, wherein, the stored rights message is verified, during the further verification step, by comparing the digest of the right contained in said rights message with a digest calculated by the security module, when the result of the comparison of the digests is negative a default state is determined.

5. The method according to the claim 1, wherein the default state represents a working of the apparatus with restricted rights or a blocking of the security module.

6. The method according to claim 1, wherein the further verification step is carried out either during the start of the apparatus, or on reception of a control message, or on a command sent by a management message, or periodically at predetermined intervals.

7. The method according to claim 1, wherein only the digest encrypted with the unique key of the security module is stored in the messages memory, during verification, said digest is decrypted and compared with a digest calculated on the corresponding right stored in the rights memory.

8. A method of verification of rights contained in a security module associated to an apparatus processing broadcasted digital data, the rights comprising instructions and parameters, authorizing a user to access to the broadcast digital data, said apparatus being connected to a management center transmitting encrypted rights messages containing the rights and control messages for decrypting the broadcasted data, comprising the steps of:

receiving and reading by the security module all or part of a rights message including at least one right, and a digest obtained with a collision free unidirectional function applied on the at least one right wherein a set including the right and the digest of the right is encrypted with a unique key of the security module, decrypting the rights message by the security module with a global key, decrypting the set including the right and the digest of the right with the unique key, verifying the right of the decrypted set by comparing the digest of the right with a digest determined by the security module, when the digest of the right corresponds with the determined digest, storing all or part of said rights message in a messages memory, receiving a control message comprising at least one control word for decrypting the broadcasted data and extracting a conditional right from said control message, said conditional right defining one or more rights necessary for using the control word, during a further step of the rights message re-execution, searching in the messages memory for a stored rights message corresponding to the conditional right previously extracted and verifying the corresponding rights message by comparing the digest of the right contained in the stored rights message with a digest determined by the security module, when the digest of the right contained in the stored rights message corresponds with the determined digest, comparing the right contained in the stored rights message with the conditional right extracted from the control message, determining a default state when the result of the comparison of the rights indicates a difference.

9. The method according to claim 8, wherein the rights message is stored in the messages memory after decryption with the global key.

10. The method according to claim 8, wherein the rights message is rejected when the verification fails with a negative result of the comparison of the two digests.

11. The method according to claim 8, wherein after the reception of the control message the stored rights message is verified by comparing the digest of the right contained in said rights message with a digest calculated by the security module, when the result of said comparison is negative a default state is determined.

12. The method according to claim 8, wherein the default state represents a working of the apparatus with restricted rights or a blocking of the security module.

13. The method according to claim 8, wherein the verification and comparison process of the conditional rights of the control message with the rights included in the stored rights messages is carried out on each reception of a control message, after the reception of a predetermined number of control messages, on command based on an instruction included in an administration message or in a control message, or periodically at predetermined intervals.

14. The method according to claim 1, wherein the apparatus consists of a Pay-TV digital audio/video data decoder equipped with a security module, said decoder being connected to a management center transmitting to said security module messages for managing and updating the rights for accessing the digital audio/video data.

15. The method according to claim 4, wherein the default state represents a working of the apparatus with restricted rights or a blocking of the security module.

16. The method according to claim 11, wherein the default state represents a working of the apparatus with restricted rights or a blocking of the security module.

17. The method according to claim 8, wherein the apparatus consists of a Pay-TV digital audio/video data decoder equipped with a security module, said decoder being connected to a management center transmitting to said security module messages for managing and updating the rights for accessing the digital audio/video data.

* * * * *